(12) United States Patent
Ogoh et al.

(10) Patent No.: US 6,690,486 B1
(45) Date of Patent: Feb. 10, 2004

(54) IMAGE FORMING APPARATUS WITH EXCELLENT GRADATION REPRODUCTION

(75) Inventors: Keiji Ogoh, Aichi-Ken (JP); Osamu Yamada, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/361,956

(22) Filed: Jul. 27, 1999

(30) Foreign Application Priority Data

Jul. 29, 1998 (JP) .......................................... 10-214631

(51) Int. Cl.[7] .............................................. G06L 15/00
(52) U.S. Cl. ....................... 358/1.9; 358/521; 358/475
(58) Field of Search ........................ 358/1.9, 501, 510, 358/521, 475, 480

(56) References Cited

U.S. PATENT DOCUMENTS

| | | | | |
|---|---|---|---|---|
| 4,214,249 A | * | 7/1980 | Kasai ........................ | 346/76 L |
| 4,912,568 A | * | 3/1990 | Shimano .................... | 358/457 |
| 5,055,943 A | * | 10/1991 | Kishida ..................... | 358/459 |
| 5,124,835 A | * | 6/1992 | Shibaguchi et al. ........ | 359/319 |
| 5,495,278 A | * | 2/1996 | Oda ........................... | 247/252 |
| 5,557,449 A | * | 9/1996 | Miyagawa ................. | 359/212 |
| 5,596,444 A |   | 1/1997 | Eguchi ...................... | 359/210 |
| 5,920,645 A | * | 7/1999 | Aida .......................... | 382/167 |
| 6,167,007 A | * | 12/2000 | Ogawa ...................... | 369/44.27 |

FOREIGN PATENT DOCUMENTS

| | | | | |
|---|---|---|---|---|
| JP | 61-32762 | * | 2/1986 | .............. B41J/3/04 |
| JP | 361111069 | * | 5/1986 | ............. H04N/1/23 |
| JP | 363212273 A | * | 9/1988 | ............. H04N/1/40 |
| JP | 402072979 | * | 3/1990 | .............. B41J/2/52 |
| JP | 6-55771 |   | 3/1994 | ............. H04N/1/04 |
| JP | 7-30755 |   | 1/1995 | .......... H04N/1/405 |
| JP | 7-89131 |   | 4/1995 | .............. B41J/2/44 |
| JP | 409118029a | * | 5/1997 | .............. B41J/2/32 |
| JP | 11105339 | * | 4/1999 | .............. B41J/2/44 |
| JP | 11-254756 | * | 9/1999 | ............ B41J/1/252 |

OTHER PUBLICATIONS

Technical Report of IEICE, Institute of Electronics, Information and Communication Engineers, LQE95–1 (May 1995), *Improved spot–size controllability in variable spot–-size laser diodes*, Shin'ichi Nakatsuka, Seiji Maruo, Akira Arimoto and Susumu Saitoh, pp.1–6.

* cited by examiner

*Primary Examiner*—Jerome Grant
(74) *Attorney, Agent, or Firm*—Morrison & Foerster, LLP

(57) ABSTRACT

An image forming apparatus forms an image with a gradation by scanning an image carrying member with a light beam based on image data. The beam is generated by using a light beam generating element capable of independently varying the beam output and the beam diameter. The output of the beam generating element is controlled based on the gradation level (density level) of the image data and the diameter of the beam from the element is controlled based on the gradation level. In short, the output of the light beam generating element and the beam diameter are controlled individually. Therefore, the exposed area of the surface of the image carrying member can be controlled properly by controlling the beam diameter as well as the output of the light beam generating unit. As a result, there can be obtained an image forming apparatus having excellent gradation reproduction over all the density regions. In controlling the output of the light beam generating element, there are cases where a light emitting time per dot is controlled or the beam intensity is controlled, depending on the gradation level of image data.

18 Claims, 19 Drawing Sheets

層1108

PT1  PT2

→ X (L)          (M)          (H)

IMAGE FORMING APPARATUS WITH EXCELLENT GRADATION REPRODUCTION

This application is based on application No. 10-214631 filed in Japan, the contents of which is hereby incorporated by reference.

BACKGROUND OF THE INVENTION

1. Field of the Invention

The present invention relates to a technique for improving, in particular, the gradation reproduction of an image in an image forming apparatus comprising an optical beam scanner.

2. Description of the Related Art

To respond to recent requests for color printing, systematization, and the like made to electrophotographic image forming apparatus, there has widely been used a digital image forming apparatus which forms an image by driving a laser diode to scan-expose a photosensitive drum based on the gradation value of image data and developing an electrostatic latent image formed thereby with a toner.

In such a digital image forming apparatus, the intensity of a light beam emitted from a laser diode or a time during which the light beam is emitted from the laser diode is modulated based on the gradation value of image data to form an electrostatic latent image by exposing, to a spot beam, each pixel on the photosensitive surface of a photosensitive drum. The electrostatic latent image is changed to a visible image by means of a developing device, thereby forming a toner image. The toner image formed on the photosensitive drum is transferred onto a recording sheet by the electrostatic force of a transfer charger and further fixed with a fixing device, resulting in an image.

The amount of toner adhered to one dot varies with a variation in the beam intensity or light emitting time of the laser diode, which allows the gradation of an original image to be represented.

In such an electrophotographic image forming apparatus, however, it is difficult to establish a completely linear relationship (linear proportion) between the density of a reproduced image (development density) and the density of the original image due to the development properties of a toner, the exposure properties of a photosensitive member, or the like. Gradation reproduction is particularly poor in a high density portion and a low density portion.

Specifically, the original density and the development density have a substantially linear relationship in a middle density portion, while having a non-linear relationship in high and low density portions where the development density changes at a lower rate than the original density.

To reproduce variations in the gradation of the original image with fidelity, it will easily be understood that a linear relationship is established preferably in any density region of the reproduced gradation.

On the other hand, there has been the problem that an image of continuous dots and an image of discontinuous dots have difference densities even if they are developed and formed based on density data representing the same gradation value, so that the reproduced gradation differs depending on a pattern to be reproduced.

The reason for this may be that, even though an exposed region of a single beam spot on the photosensitive surface is undevelopable, when continuous dots are formed, the undevelopable exposed regions of the individual beam spots overlap each other so that a developable exposure intensity is reached and a larger amount of toner is adhered thereto. Accordingly, the density is higher in the case of plotting continuous dots than in the case of plotting one discontinuous dot.

In an image forming apparatus which reproduces an image based on halftone image data, the gradation is normally represented by varying the density of halftone dots (the number of halftone dots per unit area). However, it is difficult to represent subtle gradation variations only by varying the density of halftone dots and a desired gradation can not be obtained.

SUMMARY OF THE INVENTION

The present invention has been achieved in view of the foregoing problems. It is therefore an object of the present invention to provide an image forming apparatus capable of forming an image with excellent gradation reproduction.

To attain the above object, one aspect of the present invention is An image forming apparatus for forming an image having a gradation based on image data, comprising: a light beam generating element capable of independently changing a beam output and a beam diameter; a scanning unit which performs scanning with the beam generated from the light beam generating element; a first controller which controls the beam output based on a gradation level of the image data; and a second controller which controls the beam diameter based on the gradation level of the image data.

Another aspect of the present invention is an image forming apparatus for forming an image having a gradation based on image data, comprising: a light beam generating element capable of independently changing a beam output and a beam diameter; a scanning unit which performs scanning with the beam generated from the light beam generating element; a first controller which controls the beam output based on a gradation level of the image data; and a second controller which controls the beam diameter so that the beam diameter in forming a discontinuous dot is larger than that in forming continuous dots.

Still another aspect of the present invention is an image forming apparatus for forming an image having a gradation based on image data, comprising: a light beam generator capable of independently changing a beam output and a beam diameter; a scanning unit which performs scanning with the beam generated from the light beam generating element; a first controller which controls the beam output based on a gradation level of the image data; a text region judging unit which judges whether or not the image is a text image based on the image data; and a second controller which controls the beam diameter so that the beam diameter in forming a text image is larger than that in forming a non-text image.

Yet another aspect of the present invention is an image forming apparatus for forming an image having a gradation on a image carrying member based on image data, comprising: a light beam generating element capable of independently changing a beam output and a beam diameter; a scanning unit which performs scanning with the beam generated from the light beam generating element; a first controller which controls a light emitting time of the light beam generating element per dot based on a gradation level of the image data; and a second controller which controls the beam diameter so that an area having exposure energy in excess of a specified threshold value on the image carrying member is linearly proportional to the length of the light emitting time.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

Below, the embodiments of an image forming apparatus according to the present invention will be described by using a laser printer as an example.

<Embodiment 1>

Figure 1:
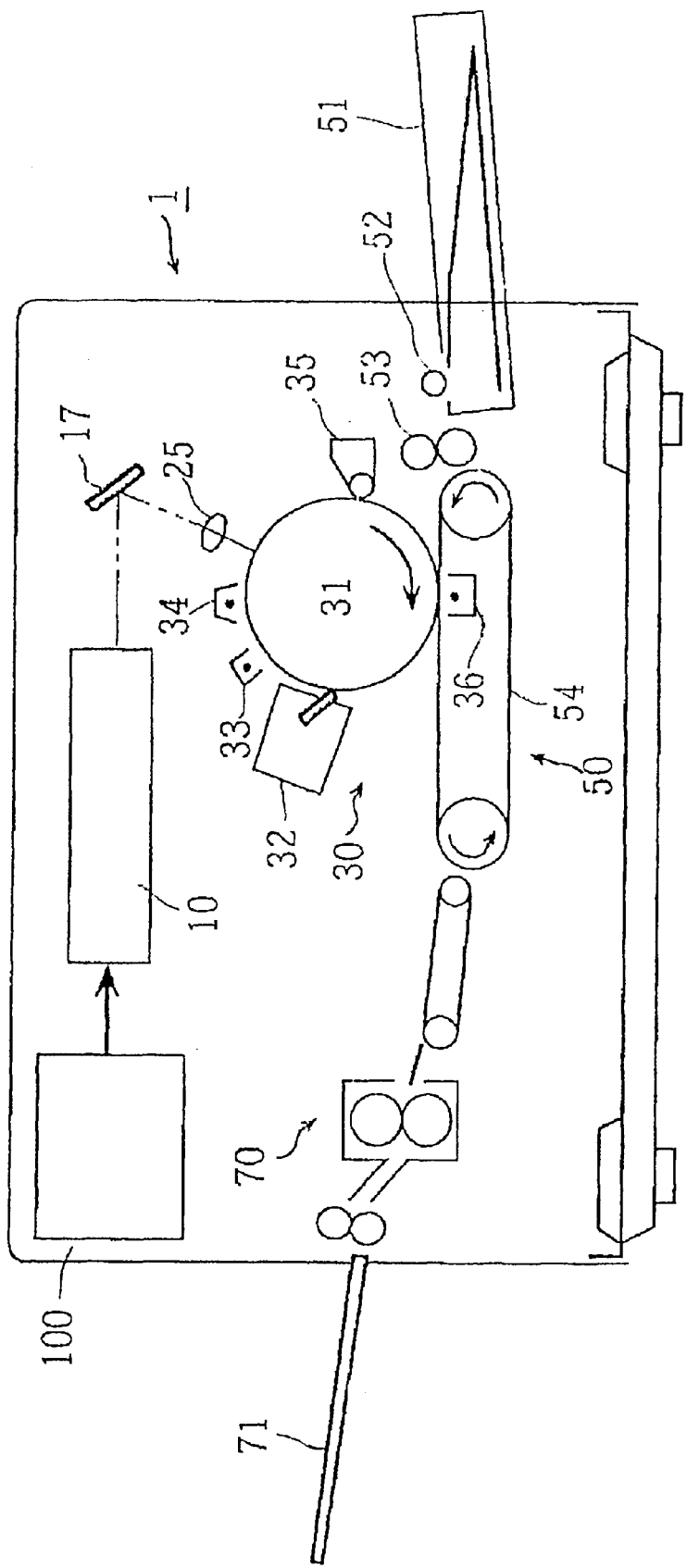
FIG. 1 is a view showing an overall structure of a printer according to Embodiment 1 of the present invention.

FIG. 1 shows a schematic cross-sectional view of a laser printer 1 according to Embodiment 1. The laser printer is mainly composed of: a laser beam scanning unit 10; an image forming unit 30; a paper transport system 50; and a control unit 100 for controlling the overall operation and transmitting a drive signal to a laser diode in the laser beam scanning unit 10.

When image data is inputted from an external terminal of a personal computer or the like, the control unit 100 converts the inputted image data to a drive signal for the laser diode in accordance with a method which will be described later, thereby driving the laser diode 11 (FIG. 2) in the laser beam scanning unit 10. The laser beam emitted from the laser diode has its optical axis changed by a reflecting mirror 17 and converged by a cylindrical lens 25 in the direction of subordinate scanning to be used for scan-exposing the photosensitive surface of a photosensitive drum 31.

The image processing unit 30 is composed of the photosensitive drum 31 located at the center and surrounded by a cleaning unit 32, an eraser lamp 33, a charging charger 34, a developing device 35, and a transfer charger 36.

The photosensitive drum 31 had a residual toner removed by the cleaning unit 32 before it is exposed to the laser beam and then discharged under radiation from an eraser lamp 33 before it is uniformly charged by the charging charger 34. An electrostatic latent image is formed when scanning exposure is performed with respect to the photosensitive surface thus uniformly charged. The electrostatic latent image is changed to a visible image with the supply of a toner from the developing device 35.

On the other hand, a recording sheet such as transfer paper is supplied from a paper supply cassette 51 of the paper transport system 50 via a pickup roller 52 and a timing roller 53. The recording sheet has been transported by a transfer belt 54 to a transfer position immediately under the photosensitive drum 31 so that a toner image on the photosensitive drum 31 receives a transfer electric field from the transfer charger 36 to be transferred onto the recording sheet. The recording sheet onto which the toner image has been transferred is separated from the transfer belt 54, fixed by a fixing device 70, and then discharged onto a discharge tray 71.

Figure 2:
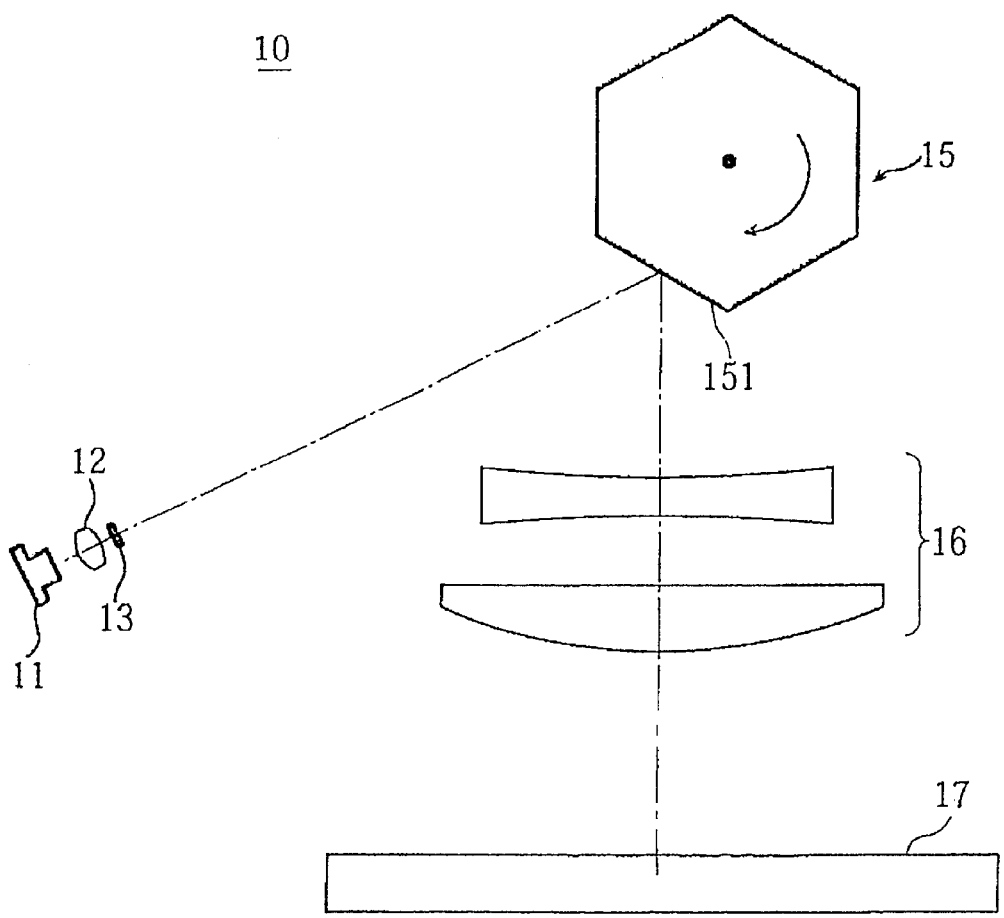
FIG. 2 is a plan view showing a structure of a principal portion of a scan-exposing unit of the printer.

FIG. 2 is a plan view showing a structure of the laser beam scanning unit 10. A laser beam emitted from the laser diode 11 is changed into a parallel beam by a collimator lens 12, converged in the subordinate scanning direction via a cylindrical lens 13, and reflected by a mirror surface 151 of a polygon mirror 15 which is rotatively driven at a constant speed by a polygon motor (not shown) such that it is polarized. After passing through a scanning lens 16, the polarized laser beam is reflected by the reflecting mirror 17 to be used for scan-exposing the surface of the photosensitive drum 31 via the cylindrical lens 25 shown in FIG. 1.

As the laser diode 11, a special-purpose laser diode capable of controlling the beam diameter independently of the control of the beam intensity is used. The laser diode is a semiconductor device comprising a beam diameter control unit and a beam intensity control unit. By varying the value of an energizing current supplied to the beam diameter control unit, the laser diode can independently control the beam diameter in one direction, while holding the beam energy constant. It is to be noted that the beam intensity can also be changed in conjunction therewith. The structure and control properties of the laser diode are disclosed in "Study of Spot Diameter Controllability of Spot Diameter Variable Semiconductor Laser", TECHNICAL REPORT OF IEICE. (The Institute of Electronics, Information and Communication Engineers) LQE95-1 1995-05 p.1 and in Japanese Unexamined Patent Publication HEI No. 7-89131.

Figure 3:
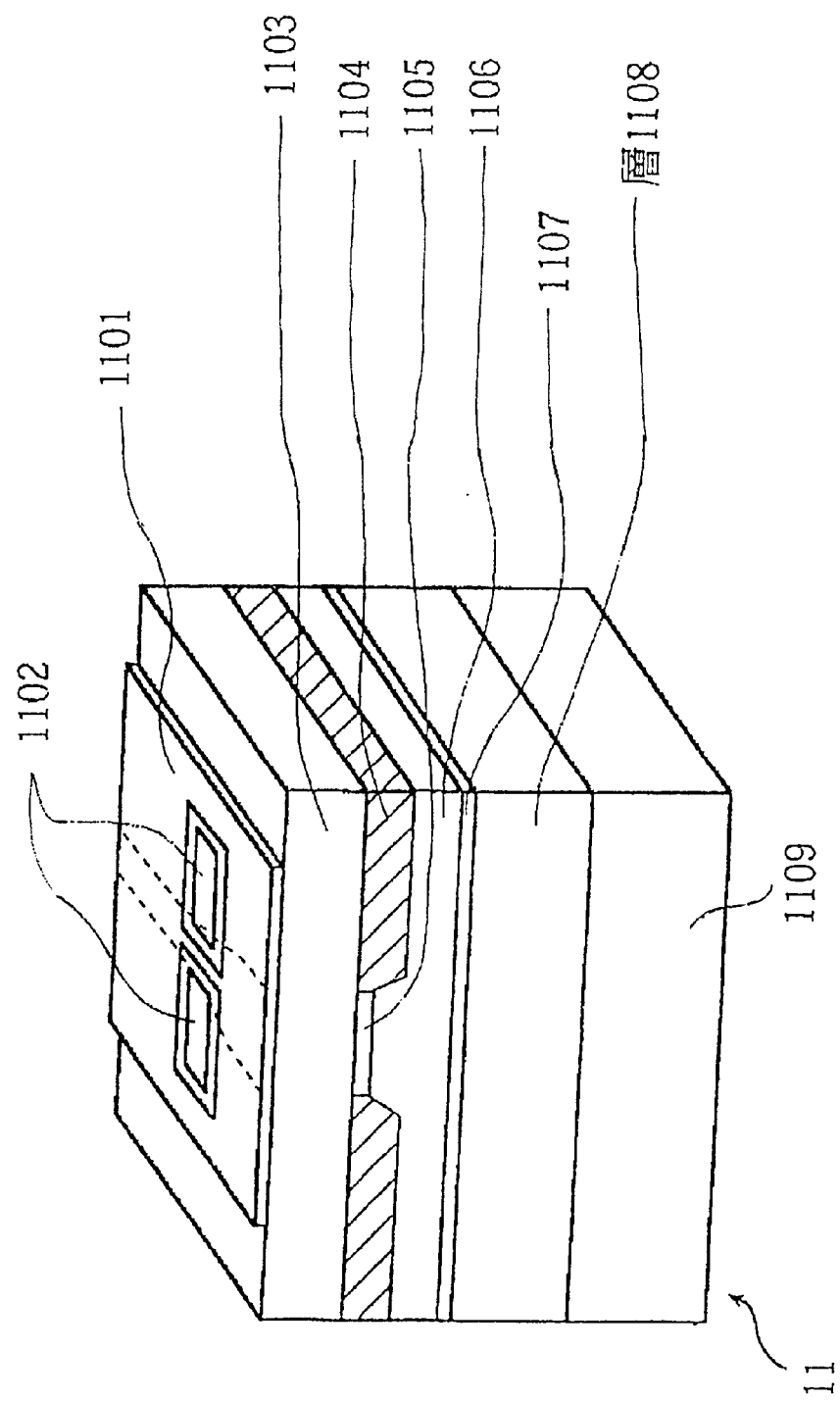
FIG. 3 is a perspective view showing a structure of a beam diameter of variable laser diode.

FIG. 3 is a perspective view showing a cross-sectional structure of the beam diameter variable laser diode 11. As shown in the drawing, the laser diode 11 is composed of: a main electrode 1101 for varying the beam output; a control electrode 1102 for varying the beam diameter; a p-type contact layer 1103; an n-type block layer 1104; a p-type cap layer 1105; a p-type clad layer 1106; an active layer 1107; an n-type clad layer 1108; and a crystal substrate 1109. By controlling the amount of charge supplied to the main electrode 1101, i.e., the amount of current, a laser beam having an intensity responsive to the amount of charge supplied from the active layer 1107 is emitted. On the other hand, the diameter of the emitted laser beam can be varied by controlling the amount of charge supplied to the control electrode 1102.

Figure 4:
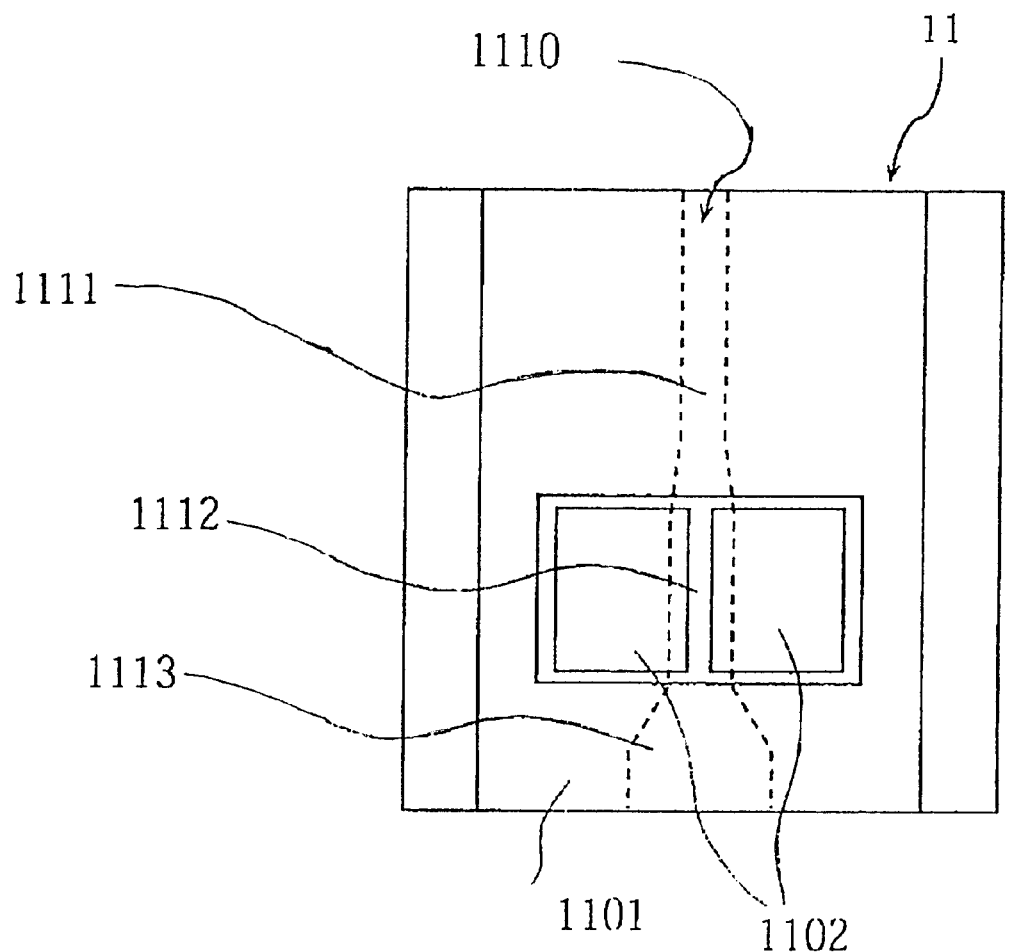
FIG. 4 is a plan view of the laser diode.

FIG. 4 is a plan view of the laser diode 11. As shown in the drawing, a stripe structure 1110 formed in the top face of the p-type clad layer 1106 is composed of: a flared region 1113 having a flared configuration which widens in the vicinity of the end face; a modulation region 1112 consisting of two stripes parallel to each other in which charge is injected from the control electrode 1102; and a single stripe region 1111. The injection of charge into the modulation region 1112 reduces the refractive index of the active layer 1107 underlying the two stripes of the modulation region 1112, so that a high refractive index region is formed at the center of the stripe structure 1110. Such a high refractive index region shows a lens effect and changes the configuration of the beam at the laser beam emitting end face.

In this manner, the diameter of the laser beam radiated from the laser diode 11 can be varied independently of the beam output in response to a variation in charge injected into the control electrode 1102.

To fully exert the effect of a variable beam diameter, which will be described later, in the present embodiment, the laser diode 11 is preferably disposed such that the beam diameter is variable in the subordinate scanning direction (direction perpendicular to the paper face of FIG. 2). Even if the direction in which the beam diameter is variable is not in perfect agreement with the subordinate scanning direction, the effect of improving gradation reproduction due to a variable beam diameter is achieved to some extent provided that the beam diameter is variable in a direction at a given angle with the main scanning direction.

Figure 5:
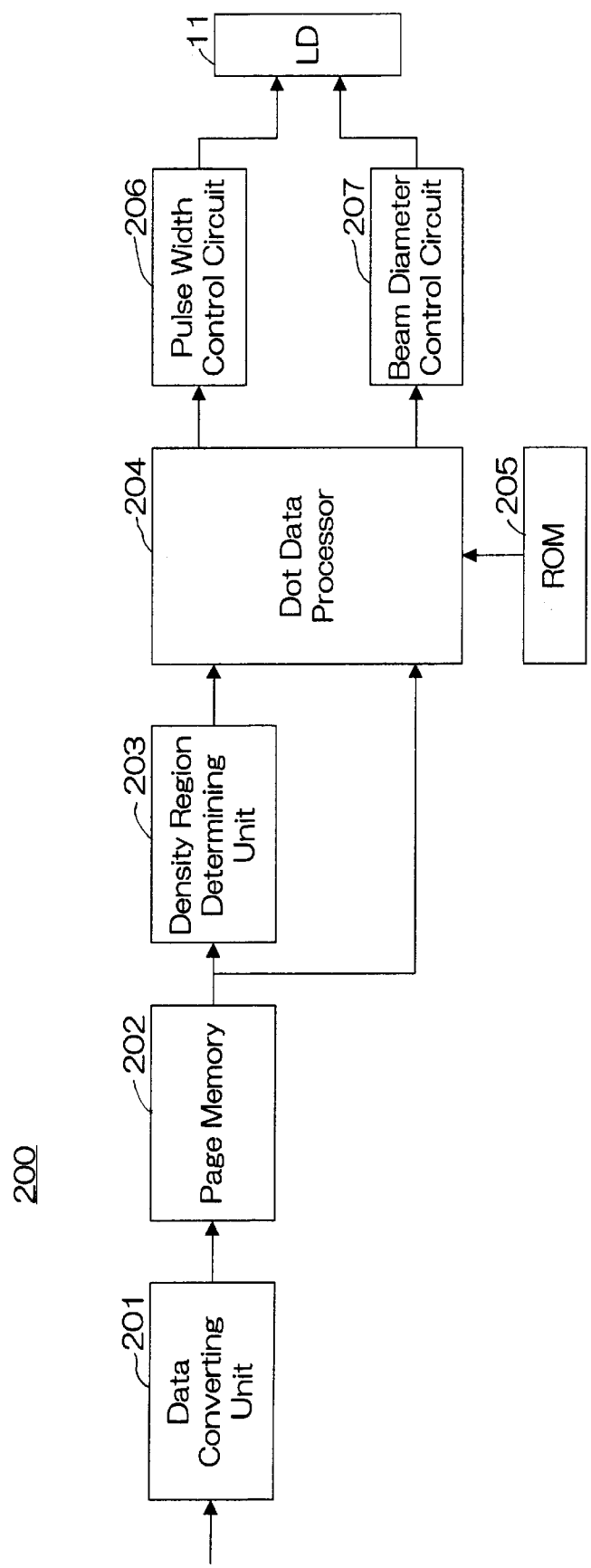
FIG. 5 is a block diagram showing a structure of a LD control circuit in Embodiment 1.

FIG. 5 is a block diagram showing a structure of an LD control circuit 200 for controlling the output of the laser diode 11. The LD control circuit 200 is embedded in the control unit 100.

The LD control circuit 200 is composed of a data converting unit 201; a page memory 202; a density region determining unit (density region judging unit) 203; a dot data processor 204; a ROM 205; a pulse width control circuit 206; and a beam diameter control circuit 207. The density region discriminator 203 determines a density region to which image data (gradation data) belongs.

Print data transmitted from an external terminal such as a personal computer or an image reader is inputted to a data converting unit 201 where necessary processing is performed with respect to the print data. If the print data is analog density data, for example, it is changed by A/D conversion to gradation data (tone data) represented by 256 gradation values (tone values) from 0 to 255 and further subjected to bitmap expansion to be outputted to the page memory 202. The page memory 202 stores the bitmap data on a page-by-page basis.

During image formation, gradation data for a page of which an image should be formed is read by one scanning line after another from the page memory 202 and outputted to the density region determining unit 203 and to the dot data processor 204. The density region determining unit 203 determines which density region the gradation data of concern belongs to and outputs the result of determination to the dot data processor 204.

The dot data processor 204 controls, based on the result of determination from the density region determining unit 204, a time during which a light beam is emitted from the laser diode 11 and the diameter of the beam in plotting one pixel by generating a control signal to the pulse width control circuit 206 and to the beam diameter control circuit 207, while referring to a table in the ROM 205.

It is to be noted that three density regions are distinguished by the density region determining unit 203 in the present embodiment, which are a low density region where a gradation value is d1 or less, a middle density region where a gradation value is in the range of d1 to d2, and a high density region where a gradation value is d2 or more. Specific values of the gradation values d1, d2 (d1<d2) are determined as follows based on gradation reproducing properties specific to a printer.

Figure 6A:
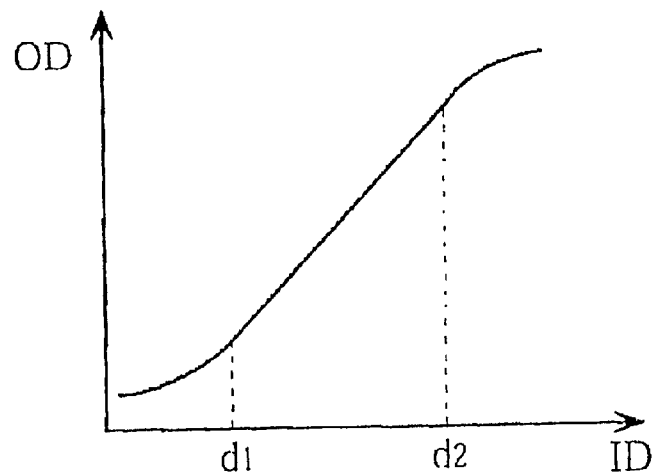
FIG. 6($a$) is a view showing conventional gradation reproducing properties, FIG. 6($b$) is a view showing the relationship between a density level and beam diameter control in Embodiment 1, and FIG. 6($c$) is a view showing gradation reproducing properties obtained by the present embodiment.

FIG. 6(a) is a graph showing gradation reproducing properties in a typical electrophotographic printer, in which a horizontal axis represents a density value (ID) for input image data and a vertical axis represents a density value (OD) after development. Although a nearly linear relationship is observed between ID and OD in the middle density region as shown on the graph, a linear relationship is not observed therebetween at the high and low density regions where an OD change rate relative to an ID change rate is reduced.

To restore a linear relationship in those regions, upper-limit and lower-limit gradation values at which gradation variations retain a linear relationship are experimentally obtained and designated at d1, d2, respectively. When the gradation is represented at 256 levels, d1 is normally set to a value in the vicinity of 50 and d2 is normally set to a value in the vicinity of 200.

The lack of linearity at the high and low density regions may be attributed primarily to the interference between beam spots when the photosensitive drum is exposed. That is, it can be considered that, in exposing the photosensitive surface of the photosensitive drum to a spot beam, a region that is originally undevelopable because of its exposure intensity is changed into a developable region due to the overlapping of spots for plotting adjacent pixels and the interference between such beam spots impairs linearity, in cooperation with the photosensitive properties of the photosensitive drum, especially at the high and low density regions.

Figure 6B:
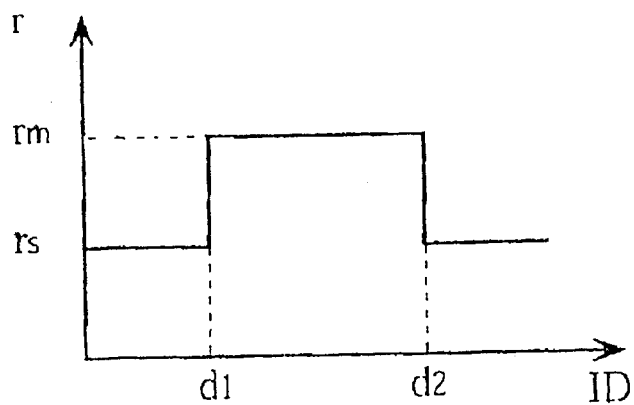

To restore the linearity, the present embodiment adjusts a beam diameter rs in the subordinate scanning direction in the high and low density regions to be smaller than a beam diameter rm in the same direction in the middle density region as shown in FIG. 6(b), thereby reducing the interference between the beam spots in any density region. This achieves excellent gradation reproducing properties which vary substantially linearly over the entire density range in which reproduction is possible (between a1 and a2). It is to be noted that the region with a1 or less and the region with a2 or more are regions at constant densities where gradation reproduction cannot be performed due to developing properties.

From the foregoing reason, it should be deduced that a reduction in beam diameter in the subordinate scanning direction also increases gradation reproduction in the middle density region. However, since a linear relationship is originally established in the region, as shown in FIG. 6(a), there is little necessity for that. On the contrary, variations in dot spacing (hereinafter referred to as "inconsistent dots") during plotting become more conspicuous if the beam diameter is reduced in the region. Briefly, there are cases where a spacing between dots plotted on the photosensitive drum varies due to a temperature variation or to variations among optical devices. In particular, an accuracy error between the individual mirror surfaces of the polygon mirror causes inconsistent dots in the direction in which main scanning is performed along each scanning line.

In general, the inconsistent dots tend to be more conspicuous as the diameters of the dots are smaller.

Figure 7A:
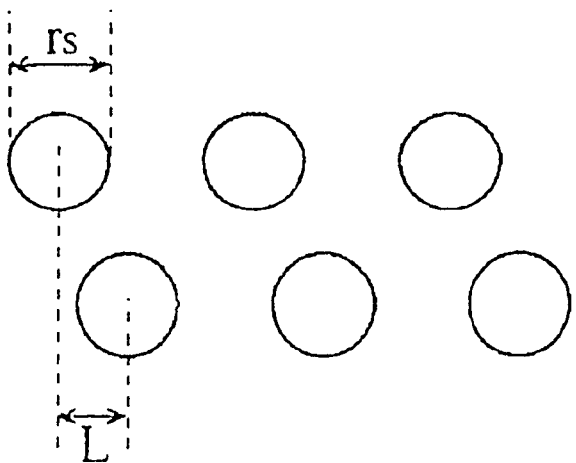
FIG. 7 are views for illustrating the relationship between an apparent amount of dot shift and a dot diameter.
Figure 7B:
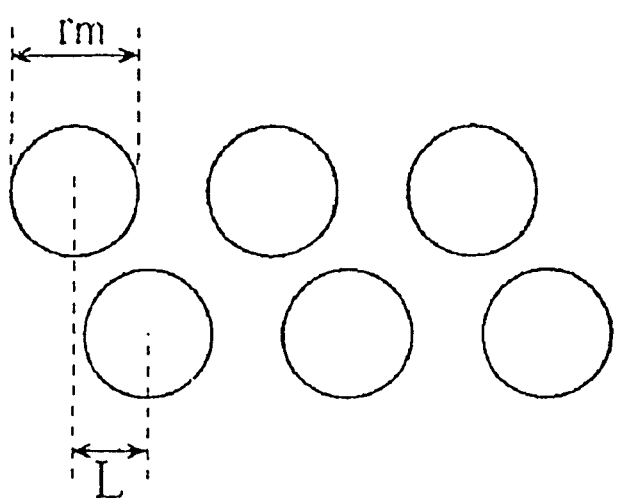

FIGS. 7(a) and 7(b) are views diagrammatically showing the tendency, of which FIG. 7(a) depicts the case where plotting is performed with the small beam diameter rs and FIG. 7(b) depicts the case where plotting is performed with the large beam diameter rm. Although the amount of shift in plotting position is L in either case, apparent amounts of shift in the respective cases are L/rs and L/rm. Since L/rs>L/rm is satisfied, it will be appreciated that the inconsistent dots are more conspicuous as the diameters of the dots are smaller.

In the present embodiment, the beam diameter is not reduced in the middle density region since the presence of inconsistent dots in the middle density region, which is most visible to an observer, leads to degraded image quality, though the presence of more or less inconsistent dots are substantially unnoticeable.

As a specific value of the beam diameter rs, an optimum one is calculated by actually measuring reproduction densities in the case of varying the beam diameter and repeatedly acquiring data representing gradation reproducing properties. The value rs need not necessarily be the same in each of the high and low density regions. Alternatively, it is also possible to subdivide each of the high and low density regions into subordinate density regions and control the beam diameter such that the beam diameter gradually increases as the density level (gradation level) increases in the low density region and gradually decreases as the density level (gradation level) increases in the high density region.

A table representing the relationship depicted in FIG. 6(b) is stored in the ROM 205. The dot data processor 204 receives gradation data from the page memory 202, while receiving data on the density region of the gradation data, i.e., data representing the density level from the density region determining unit 203. A signal indicative of an optimum beam diameter is generated by checking the data on the density region against the table in the ROM 205 and the beam diameter indicative signal is outputted to the beam diameter control circuit 207 in synchronization with the outputting of the corresponding gradation data to the pulse width control circuit 206.

The pulse width control circuit 206 controls a light emitting time per dot by varying, based on the gradation value, the pulse width of a drive current supplied to the laser diode. The beam diameter control circuit 207 generates, based on the signal indicative of the beam diameter, a control current with which the diameter of the beam from the laser diode 11 in the subordinate scanning direction has the designated value, thereby energizing the beam diameter driving element of the laser diode 11.

Figure 6C:
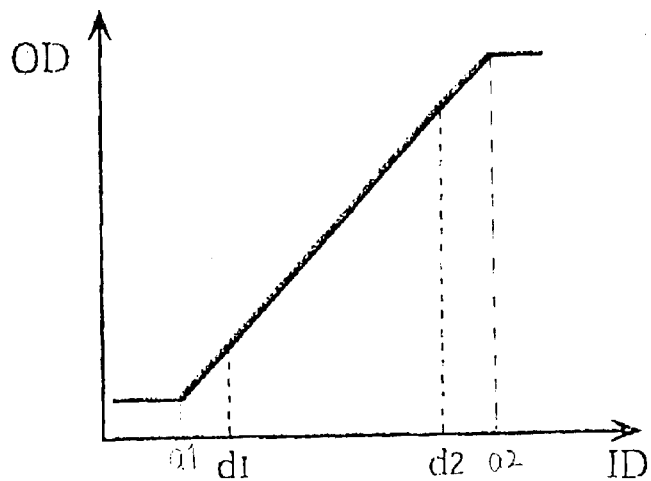

The driving of such a laser diode 11 is naturally performed in synchronization with the rotative driving of the polygon mirror by the laser beam scanning unit 10 and with the image processing unit 30 and the paper transport system 50, whereby an image with excellent gradation reproduction as shown in FIG. 6(c) is formed on the recording sheet.

<Embodiment 2>

By contrast to the foregoing embodiment that has described the structure for improving the overall gradation reproduction by varying the beam diameter among the density regions, Embodiment 2 aims at improving gradation reproduction particularly in the case where plotting is performed by representing one pixel in a dot pattern (gradation pattern) consisting of a matrix of plural dots.

Figure 8:
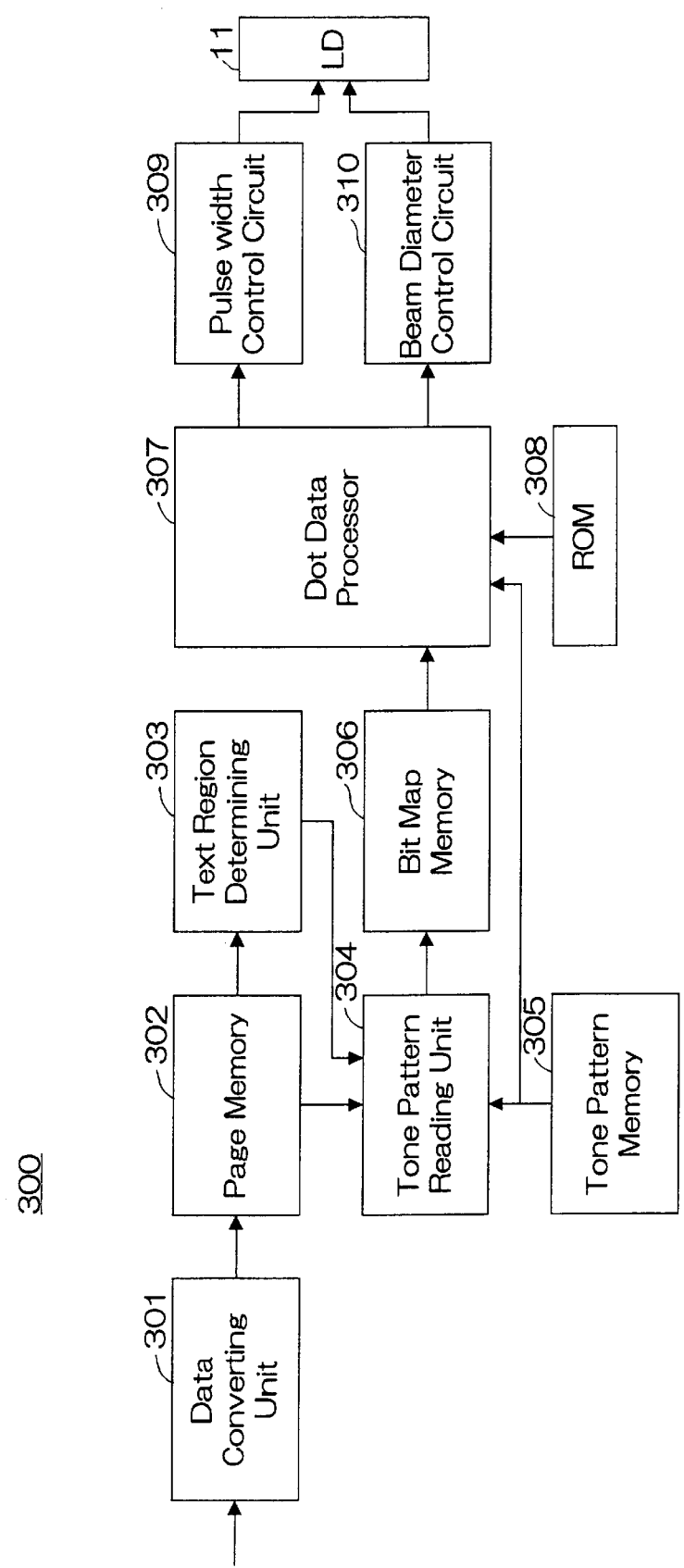
FIG. 8 is a block diagram showing a structure of an LD control circuit in a second embodiment.

FIG. 8 is a block diagram showing a structure of an LD control circuit 300 in a printer according to Embodiment 2.

The LD control circuit 300 is composed of: a data converting unit 301; a page memory 302; a text region determining unit (text region judging unit) 303; a gradation pattern (tone pattern) data calling unit 304; a gradation pattern (tone pattern) memory 305; a bit map memory 306; a dot data processor 307; a ROM 308; a pulse width control circuit 309; and a beam diameter control circuit 310. The gradation pattern memory 305 stores a gradation pattern in accordance with the gradation level of image data.

Print data transmitted from an external terminal such as a personal computer or an image reader is inputted to the data converting unit 301, subjected to necessary processing such as A/D conversion so that it is converted to gradation data, and then stored in the page memory 302 on a page-by-page basis.

During image formation, gradation data for a page of which an image should be formed is read by one scanning line after another from the page memory 302 and outputted to the text region determining unit 303 and to the gradation pattern data calling unit 304. The text region determining unit 303 determines whether or not the gradation data of concern is image data for the text portion (text region) of the original and outputs the result of determination to the gradation pattern calling unit 304. The description of the method of determining the text region will be omitted herein, since it is a well known technique.

The gradation pattern calling unit 304 calls the corresponding gradation pattern from the gradation pattern memory 305 based on the gradation data read from the page memory 302 and on the result of determining whether or not the gradation data represents the text region outputted from the text region determining unit 303.

Figure 9:
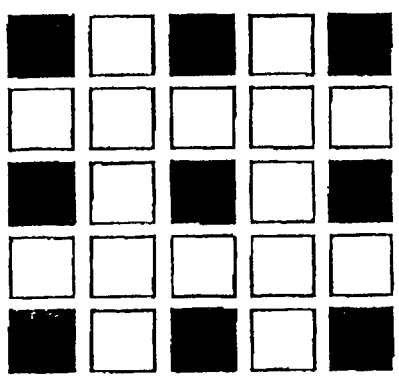
FIG. 9 is a view showing an example of a gradation pattern stored in a gradation pattern memory of the LD control circuit.
Figure 9:
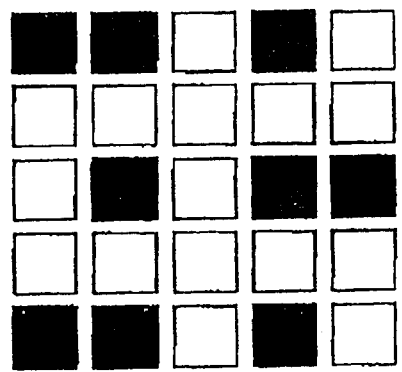

In the gradation pattern memory 305, two types of gradation patterns are prepared for the same gradation value. The patterns PT1, PT2 of FIG. 9 exemplify the two types of gradation patterns, each of which is represented as a 5×5 matrix, has 9 black dots, and indicates the same gradation value. The pattern PT2 has more continuous dots so that it is suitable for the reproduction of a text image containing solid lines. The other pattern PT1 has black dots dispersed therein so that it is suitable for the reproduction of a non-text region, particularly a middle gradation portion. The gradation pattern memory 305 stores two types of gradation patterns corresponding to each gradation value.

The gradation pattern calling unit 304 selects, from the gradation pattern memory 305, the gradation pattern having the number of black dots corresponding to the gradation value based on the gradation value of the gradation data, selects either of the patterns PT1 and PT2 as the optimum gradation pattern based on the result of determination from the text region determining unit 303, and stores the selected one as the optimum gradation pattern in the bit map memory 306.

On the other hand, data on the gradation pattern selected for each pixel (pattern data) is outputted to the dot data processor 307. The pattern data contains contiguous dot data.

The dot data processor 307 judges, based on the pattern data from the gradation pattern memory 305, whether or not the dot to be plotted forms a discontinuous dot or a part of continuous dots, while reading the bit map data by one scanning line after another from the bit map memory 306, refers to the table stored in the ROM 308, and transmits a gradation signal for the dot of concern and a beam diameter control signal to the pulse width control circuit 309 and the beam diameter control circuit 310, respectively, thereby driving the laser diode 11.

A detailed description will be given to the content of control over the beam diameter (in the subordinate scanning direction) in the foregoing dot data processor 307.

Figure 10A:
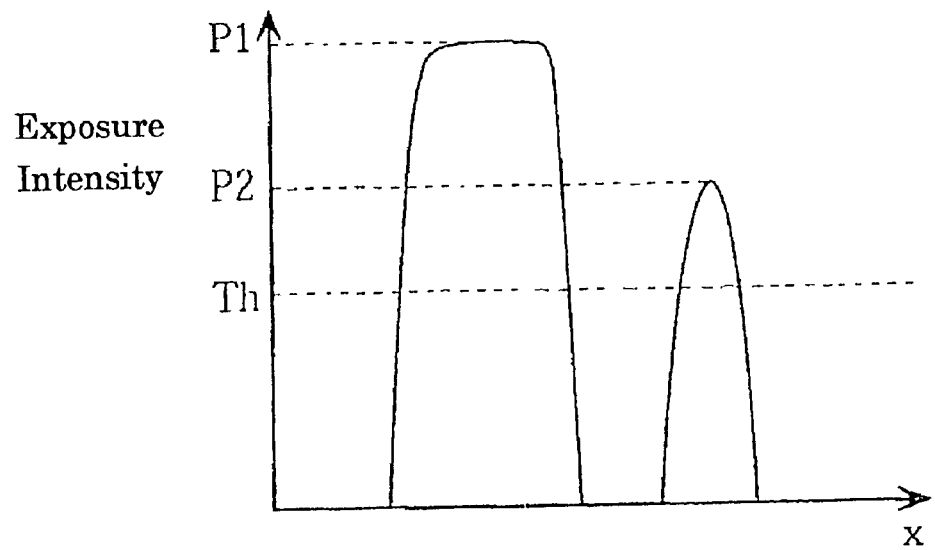
FIG. 10($a$) is a view showing a difference between exposure intensities for continuous dots and a discontinuous dot in the case of performing plotting without varying the beam diameter and FIG. 10($b$) is a view showing exposure intensities when the beam diameter is controlled to be smaller in plotting continuous dots than in plotting a discontinuous dot.
Figure 10B:
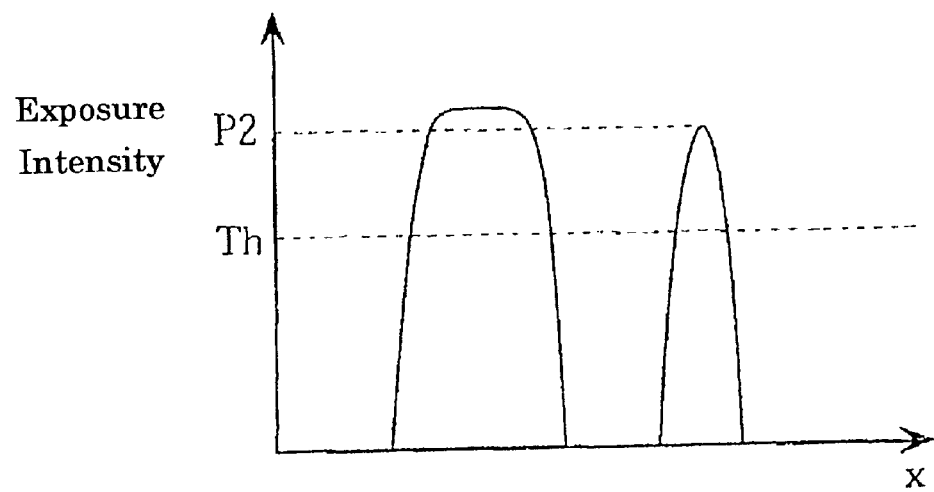

In the particular case where one pixel is formed of a plurality of dots for representing a gradation, as in the present embodiment, the spacing between the dots is reduced significantly. If the dots are continuous, beam spots for plotting the individual dots accordingly have increased overlapping portions. In the case where the pattern PT2 of FIG. 9, for example, is selected as the gradation pattern, if the dots in the uppermost row of the pattern PT2 is actually plotted without varying the beam diameter, the distribution of exposure intensities over the center portion thereof in the X direction is as shown in FIG. 10(*a*). In the present embodiment, the drive pulse width in forming 1 dot has a 100% duty ratio. In plotting adjacent two dots, exposure is performed continuously by the width of the drive pulse.

As shown in the drawing, the peak value of the exposure intensities for the continuous dots becomes P1, which is much larger than the peak value P2 of the exposure intensities for the discontinuous dots. The lowest developable level (threshold level) of the exposure intensity is designated at Th. The exposed area of the portion of each exposure intensity distribution having an exposure intensity equal to or higher than the threshold level Th (developable exposed area of the photosensitive surface) corresponds to the amount of adhered toner. When the peak value is large, the developable exposed area at the bottom portion of the photosensitive surface becomes large, which accordingly increases the amount of adhered toner and the density to a level higher than desired.

Figure 11A:
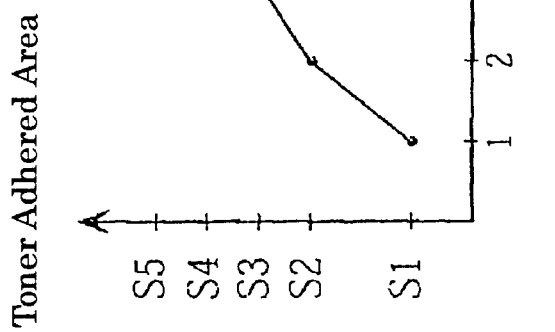
FIG. 11 are views showing the relationship between the number of continuous dots and the amount of toner adhered thereto when plotting is performed without varying the beam diameter.
Figure 11B:
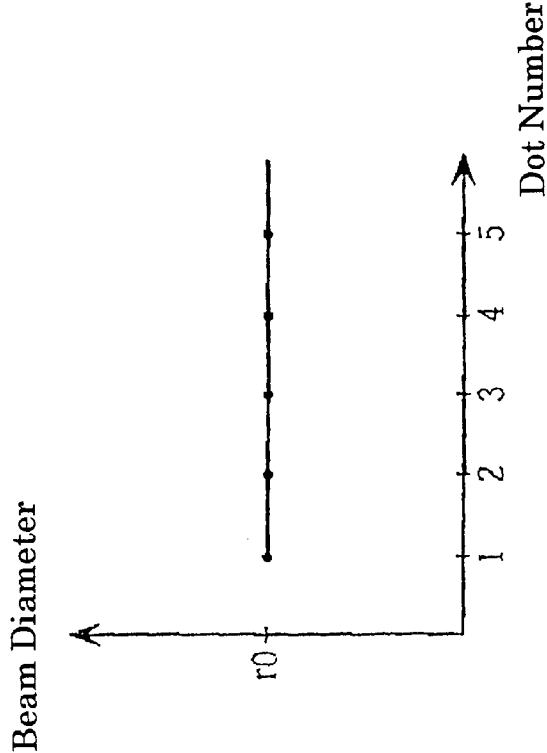

FIGS. 11(*a*) and 11(*b*) graphically show the situation. If the beam diameter is constantly fixed at r0 irrespective of the number of dots to be plotted continuously, as shown in FIG. 11(*a*), the area to which toner is adhered (or developable exposed area) is small only when 1 dot (discontinuous dot) is plotted and increases in proportion to the number of dots when two or more dots are plotted, as shown in FIG. 11(*b*).

This causes the disadvantage that, by contrast to the pattern PT1 in which the same gradation value is represented only by discontinuous dots, the pattern PT2 containing continuous dots is increased in density when reproduced, though the original gradation data has the same gradation value.

To overcome the disadvantage, the present embodiment controls the beam diameter such that it becomes larger in plotting a discontinuous dot than in plotting continuous dots.

Figure 12B:
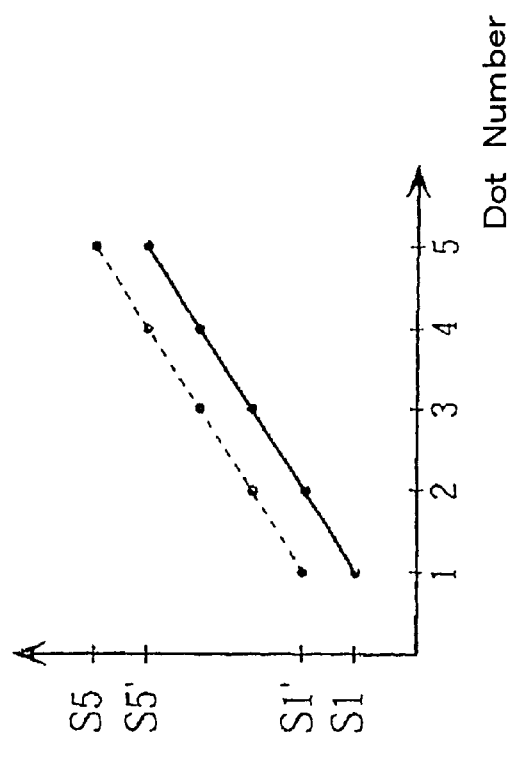
FIG. 12 are views showing the relationship between the number of continuous dots and the amount of toner adhered thereto when plotting is performed by varying the beam diameter for discontinuous dots and continuous dots.
Figure 12A:
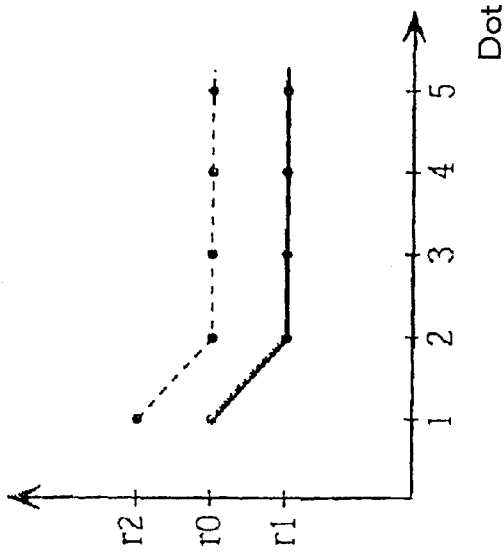

FIG. 12(*a*) is a graph showing variations in beam diameter in the present embodiment. As indicated by the solid line, the beam diameter is held at r0 when the number of dots is 1 and set to r1 smaller than r0 when two or more dots are continued, whereby the area to which toner is adhered linearly changes from a discontinuous dot to continuous dots, as indicated by the solid line of FIG. 12(*b*). FIG. 10(*b*) shows the distribution of exposure intensities in this case. As shown in the drawing, peak values for the discontinuous and continuous dots are substantially equal.

It is to be noted that the broken portion of FIG. 12(*a*) shows the case where the beam diameter is increased only for the discontinuous dot without changing the beam diameter for the continuous dot. In this case also, the area to which toner is adhered can be changed linearly, as indicated by the broken line of FIG. 12(*b*), though the density is slightly increased as a whole.

By thus changing the beam diameter such that it becomes larger in plotting the discontinuous dot than in plotting the continuous dots, stable toner representation unaffected by dot arrangement can be achieved.

Specific values of the beam diameter r0 to r3 differ depending on such conditions as the width of a dot actually plotted and the exposure properties of the photosensitive drum, so that they are optimized by repeatedly performing plotting tests.

The foregoing conditions for the beam diameter are stored in the ROM 308. The dot data processor 307 generates a control signal to the pulse width control circuit 309 and the beam diameter control circuit 310 based on pattern data obtained from the gradation pattern memory 305, while referring to the table in the ROM 308, thereby controlling the intensity and diameter of the beam from the laser diode 11 in plotting each pixel.

Although the present embodiment has represented one pixel in a 5×5 gradation pattern, the present invention is also applicable to a dither method in which the gradation values of a plurality of pixels are artificially represented in a matrix of plural dots. Even in the case of plotting one pixel in one dot, the overlapping of beam spots also presents a problem in forming a high-density image, so that, in this case also, the beam diameter is controlled preferably as described above.

Although the description has been given above to so-called one-dimensional overlapping of beam spots in a linear direction, two dimensional overlapping of beam spots may also be considered such that the beam diameter is controlled depending on the degree of overlapping.

Although the dot data processor 307 has determined whether or not the dot to be plotted is a part of continuous dots based on data on the gradation pattern from the gradation pattern memory 305, as described above, the determination may also be made by directly searching the dot data stored in the bit map memory 306.

The foregoing technical principle, i.e., the principle of changing the beam diameter to reduce the degree of interference between beam spots at continuous dots is also generally applicable to gradation representation achieved by controlling the pulse width. In this case, an image with excellent gradation reproduction can be formed by changing the beam diameter such that the time during which light is emitted from the laser diode is linearly proportional to the area of an exposed surface portion of the photosensitive member having an exposure intensity equal to or higher than the developable level (developable exposed area).

In this case, the beam diameter may be varied continuously such that the linearity of gradation variations is maintained depending on the light emitting time or may be reduced stepwise at given light emitting times. A table showing the values of the beam diameter corresponding to the individual light emitting times and conditional expressions are preliminarily calculated by experiment or by simulation and stored in the ROM, based on which the beam diameter is controlled.

<Embodiment 3>

In contrast to Embodiment 2 which has described the case where image formation is performed by changing normal image data into the gradation pattern, Embodiment 3 will describe the case where image data to be plotted is performed is halftone data. In short, an image with a gradation to be formed is represented in a halftone pattern.

Figure 13:
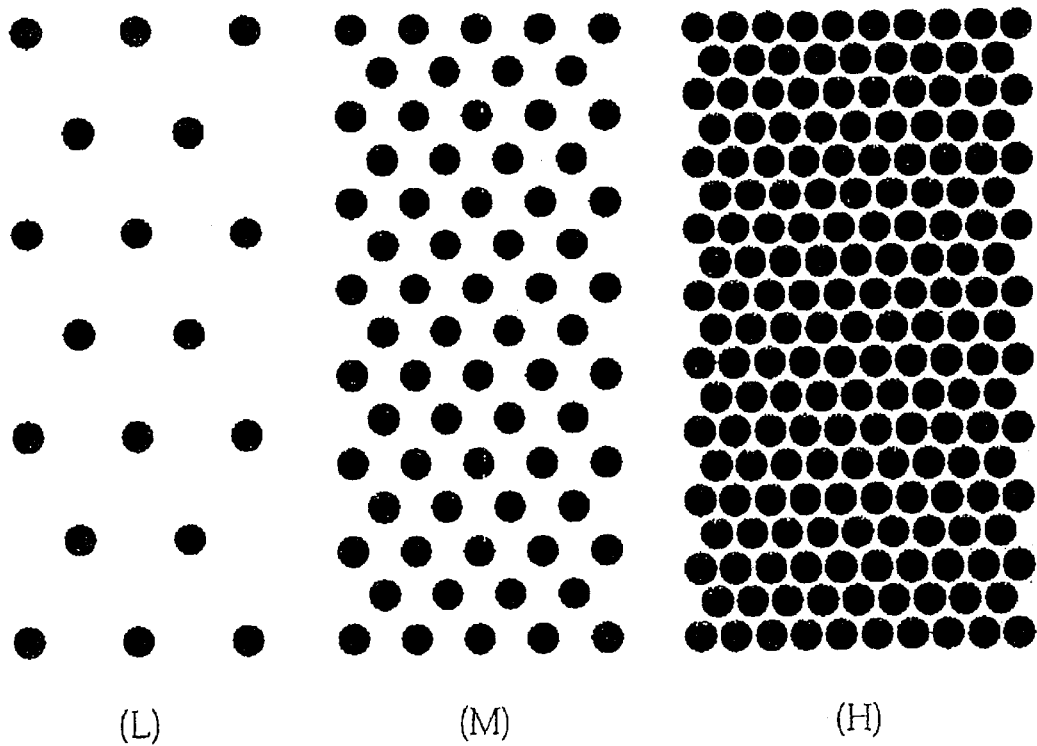
FIG. 13 is a view illustrating a conventional method of representing a gradation when image data is halftone data.

In the case of representing gradation based on halftone data in a conventional printer, the density of dots is increased in accordance with the gradation values thereof, as shown in the direction indicated by the arrow (from L to H) of FIG. 13. However, the degree of variations in dot density has a certain limitation. To represent finer gradation variations, it is necessary to vary the beam intensity in addition to varying the dot density.

Figure 14A:
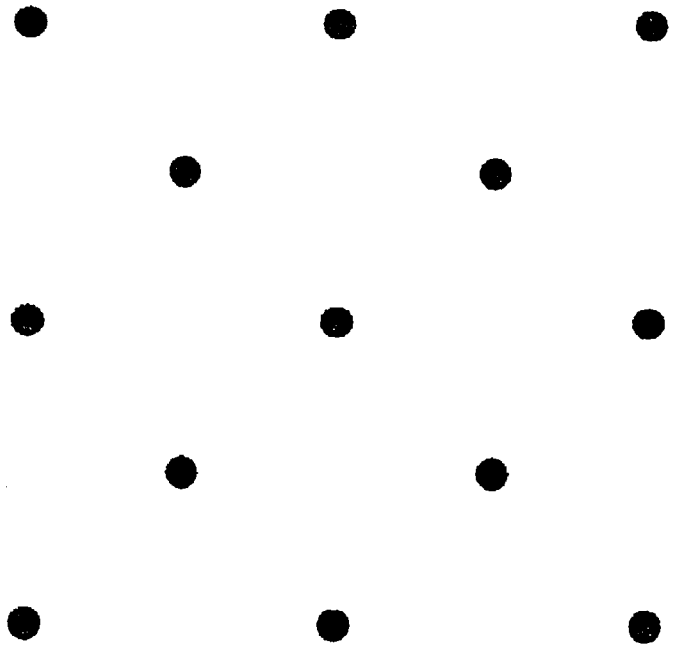
FIG. 14 are enlarged views when plotting is performed based on halftone data representing different densities in accordance with the conventional method.
Figure 14B:
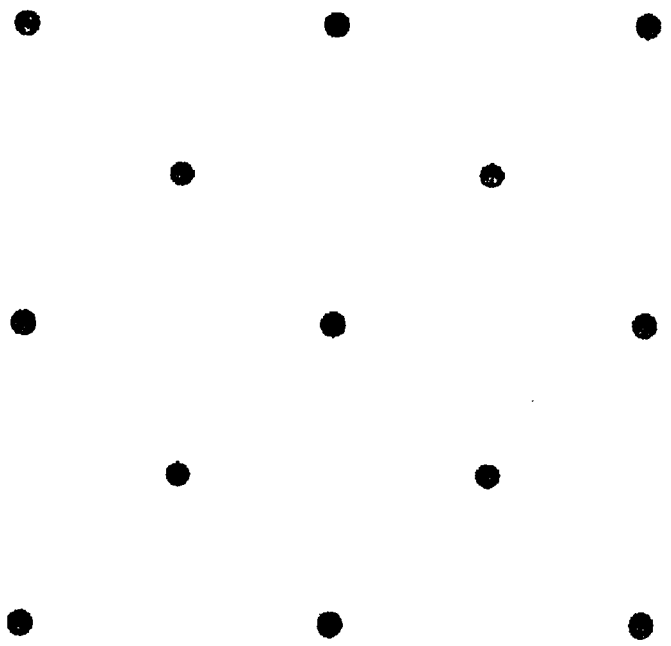

For example, FIG. 14 are views showing the case where the halftone dots of a reproduced image in a low density region are enlarged in accordance with a conventional plotting method. Although the densities of the dots are equal in FIGS. 14(a) and 14(b), provisions have been made to increase the diameters of the dots of FIG. 14(a) by increasing the intensity of the beam in plotting the dots, thereby achieving a slightly higher density. As seen from the drawings, however, it is extremely difficult to tell the density difference therebetween.

In the present embodiment, therefore, the dimension of each halftone dot, i.e., the developable exposed area per dot (hereinafter simply referred to as "spot area") is varied positively by using a beam diameter variable laser diode such that gradation reproduction is improved.

Figure 15:
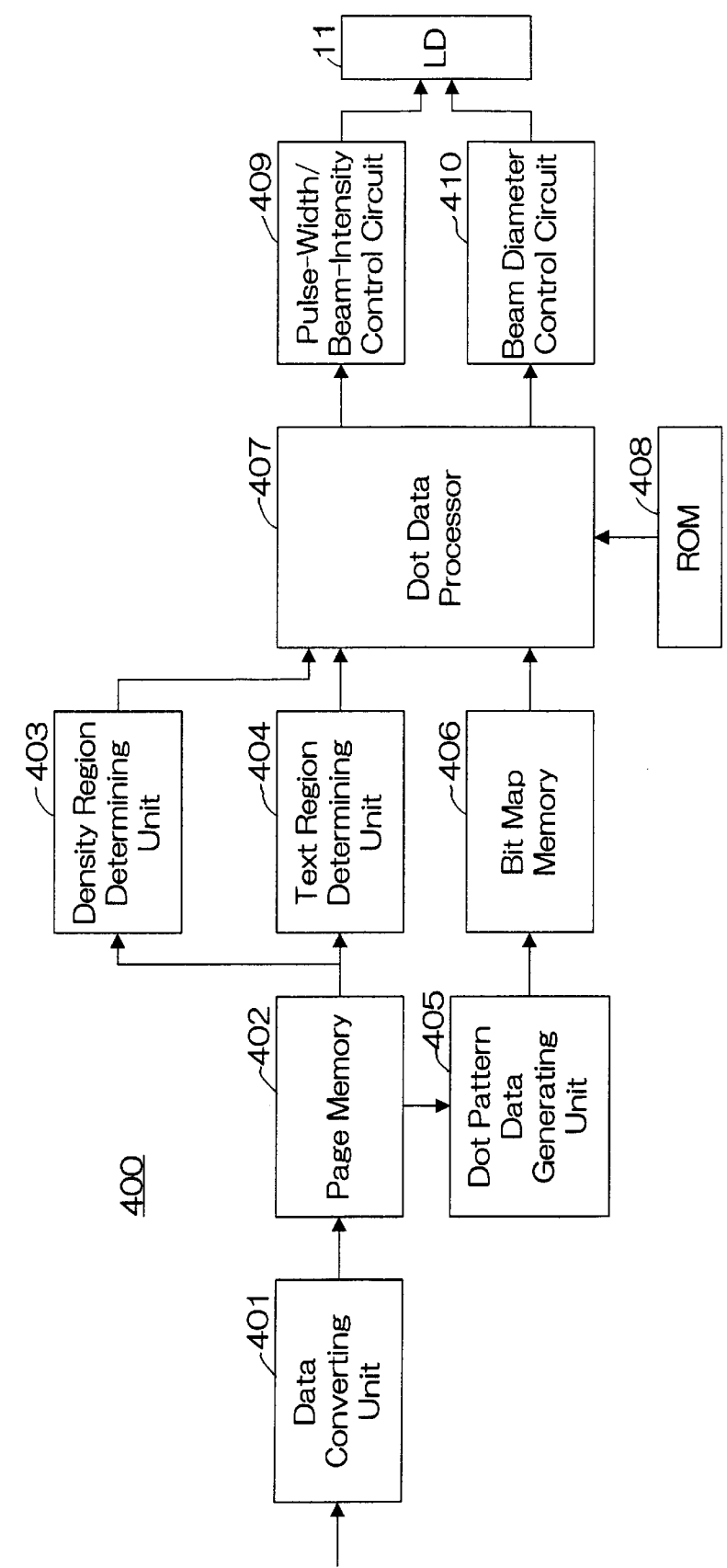
FIG. 15 is a block diagram showing a structure of an LD control circuit in Embodiment 3.

FIG. 15 shows the structure of a LD control circuit 400 for implementing the foregoing method of gradation reproduction. By way of example, the present embodiment will describe the case where representation is performed in the total of 32×8=256 gradations by varying the dot density in 32 levels and varying the spot area at each dot density in 8 levels. However, it will easily be appreciated that the combination of the number of levels in which the dot density is varied and the number of levels in which the spot area is varied is not limited thereto. Depending on the number of gradations of gradation data to be reproduced, it is also possible to vary only the dimension of the spot, while holding the dot density constant.

The LD control circuit 400 is composed of: a data converting unit 401; a page memory 402; a density region determining unit (density region judging unit) 403; a text region determining unit (text region judging unit) 404; a halftone data generating unit 405; a bit map memory 406; a dot data processor 407; a ROM 408; a pulse-width/beam-intensity control circuit 409; and a beam diameter control circuit 410.

Print data transmitted from an external terminal such as a personal computer or an image reader is inputted to the data converting unit 401, subjected to necessary processing such as A/D conversion and gradation value adjustment, and changed into gradation data at 256 levels, which is stored in the page memory 402 on a page-by-page basis.

The gradation data for a page to be printed is read from the page memory 402 by one scanning line after another and outputted to the density region determining unit 403 and to the text region determining unit 404.

The density region determining unit 403 and the text region determining unit 404 determine the density region to which a pixel of concern belongs and whether or not the pixel is included in the text region, similarly to the density region determining unit 203 (FIG. 5) and text region determining unit 303 (FIG. 8) described above, and outputs the results of determination to the dot data processor 407.

On the other hand, the halftone data generating unit 405 converts gradation data to halftone data by a known converting technique and stores the halftone data in the bit map memory 406. The halftone data generating unit 405 generates halftone dots at a density responsive to the gradation level of the image data.

The dot data processor 407 reads the bit map data from the bit map memory 406 by one scanning line after another to determine the pulse width, the beam intensity, and the bit diameter in plotting the halftone dots corresponding to the pixel of concern based on the results of determination from the foregoing density region determining unit 403 and the text region determining unit 404, while referring to the table stored in the ROM 408. The dot data processor 407 transmits a signal indicative of the beam width and the beam intensity to the pulse-width/beam-intensity control circuit 409 and a signal indicative of the beam diameter to the beam diameter control circuit 310 in synchronization therewith, thereby driving the laser diode 11.

The control of the pulse width, the beam intensity, and the beam diameter in the dot data processor 407 consists of the following three control operations.

① Control of Spot Area for Gradation Reproduction

Gradation representation is implemented by varying the density of halftone dots in 32 levels in accordance with the gradation level to be reproduced and controlling the spot diameter at the current dot density in 8 levels.

Figure 16A:
FIG. 16 are views showing individual examples when a spot configuration is varied.
Figure 16B:

FIGS. 16(a) and 16(b) are views showing patterns obtained by varying the spot configuration for plotting halftone dots, of which FIG. 16(a) shows the spot configuration (initial configuration) when no operation is performed with respect to the beam diameter or the like and FIG. 16(b) shows the case where the spot is enlarged by similar variation. The similar variation can be obtained by increasing the pulse width to increase the light emitting time in the main scanning direction and increasing the beam diameter in accordance with the light emitting time.

Figure 16C:
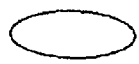
Figure 16D:

On the other hand, FIGS. 16(c) and 16(d) shows non-similar variations, of which the variation shown in FIG. 16(c) is obtained by increasing the pulse width and increasing the light emitting time only in the main scanning direction without changing the beam diameter and the variation shown in FIG. 16(d) is obtained by increasing only the beam diameter without changing the pulse width.

The spot area can be varied freely by enlarging and reducing the pulse width and the beam diameter at respective given rates by using the variations shown in FIGS. 16(c), 16(d), and 16(e) as basic patterns.

Figure 17A:
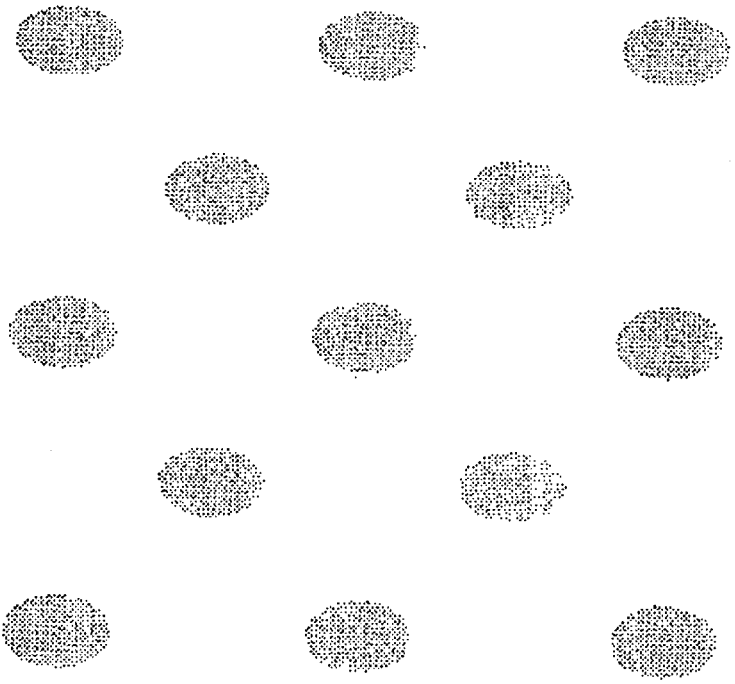
FIG. 17 are enlarged views when plotting is performed based on halftone data representing different densities in accordance with a method of Embodiment 3.
Figure 17B:
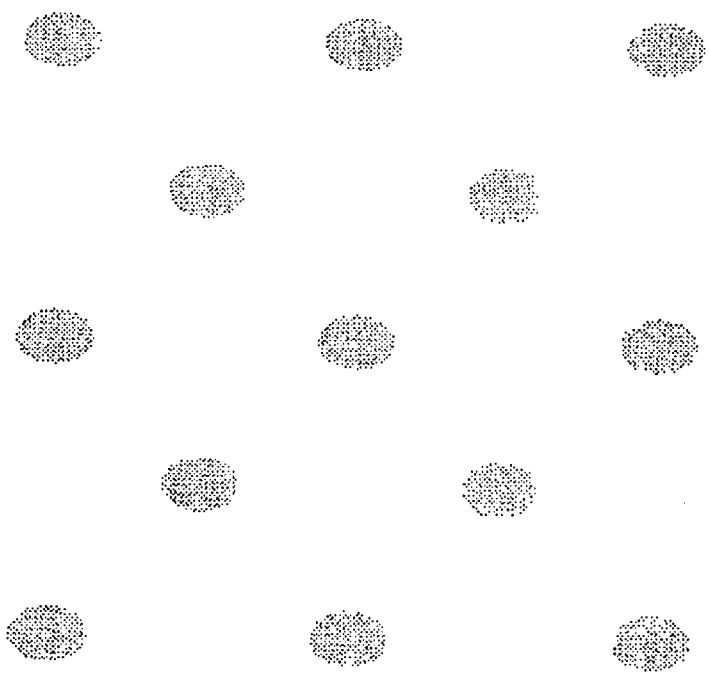

FIGS. 17(a) and 17(b) are enlarged views showing examples of gradation representations implemented by varying the spot area, which correspond to gradation values to be represented in FIGS. 14(a) and 14(b), respectively.

In FIG. 17(a), the beam intensity is reduced and the dot configuration is increased in size so that the amount of adhered toner per unit area is substantially the same as in the case of FIG. 14(a). In FIG. 17(b), likewise, the beam intensity is the same as in FIG. 17(a) and the dot configuration is reduced in size so that the amount of attached toner is the same as in the case of FIG. 14(b).

From the comparison between FIGS. 17(a) and 17(b) and FIGS. 14(a) and 14(b), it is evident that the former plotting method, i.e., the plotting method according to the present embodiment is superior in gradation reproduction since it excellently reflects the difference between gradation values for halftone data.

The beam intensity, the beam diameter, and the pulse width corresponding to such gradation values are preliminarily calculated and stored as a table in the ROM 408. The dot data processor 407 outputs a control signal to the pulse-width/beam-intensity control circuit 409 and to the beam diameter control circuit 410 to accomplish plotting by the laser diode 11, while referring to the table.

② Control of Beam Diameter in Text Region

In forming an image based on halftone data, there occurs another problem that, since plotting is performed with halftone dots, the image is less visible because of a white base seen between the halftone dots at a solid portion, in addition to the problem associated with gradation reproduction described above. When the solid portion consists of lines of a character image, in particular, the character seems faint and extremely difficult to read. If a consideration is given to the status quo in which the majority of originals to be copied are text originals, improved reproduction of a character image is required.

In the present embodiment, therefore, the spot area for halftone dots is controlled to be larger in the case of a character image, in addition to the foregoing control operation ①. Specifically, the text region determining unit 404 judges whether or not the pixel of concern belongs to the text portion. If the pixel belongs to the text portion, the dot data processor 407 instructs the pulse-width/beam-intensity control circuit 409 and the beam diameter control circuit 410 to increase the spot area in performing plotting based on halftone data corresponding to the pixel such that it is larger than in plotting an image portion which does not consist of characters (non-text region). At this time, an instruction to reduce the beam intensity with the increase in spot area is also given to the pulse-width/beam-intensity control circuit 409, thereby retaining the gradation.

Figure 18A:
FIG. 18($a$) is an enlarged view showing a reproduced image when a character image is formed based on halftone data in accordance with a conventional plotting method and FIG. 18($b$) is an enlarged view when plotting is performed according to Embodiment 3.
Figure 18B:

FIGS. 18(a) and 18(b) are enlarged views of a reproduced image obtained when the character of "日" is plotted with halftone dots, of which FIG. 18(a) shows the case where the spot area is unchanged in accordance with a conventional plotting method and FIG. 18(b) shows the case where the spot area for the text portion is increased according to the present embodiment. As is evident from the drawings, white gaps are noticeable in the line portions of the character obtained in accordance with the conventional method, while the character with the increased spot area according to the present embodiment is well-contoured and easy to read with fewer gap portions.

③ Control of Dot Diameter in Middle Density Region

Since inconsistent dots are noticeable in the middle density region as described in Embodiment 1, it is also desirable to upscale the configuration of a dot in the middle density region of a halftone image and thereby reduce an apparent amount of displacement (halftone shift).

For this purpose, the density region determining unit 403 determines whether or not the pixel read from the page memory 402 belongs to the middle density region and outputs the result of determination to the dot data processor 407.

In response to the result of determination, the dot data processor 407 instructs the pulse-width/beam-intensity control circuit 409 and the beam diameter control circuit 410 to increase the spot area in performing plotting based on halftone data corresponding to the pixel in the middle density region. Consequently, plotting is performed in the middle density region with the spot area being increased. Data on the dimension of the spot area during plotting is preliminarily determined by experiment or the like and stored in the ROM 408. As long as the spot area is larger than in the conventional embodiment even though only slightly, there is achieved the effect that the halftone shift becomes the less noticeable. It will easily be appreciated that, since the occurrence of interference between spots is undesirable in terms of gradation representation as described in Embodiment 2, the increase in spot area has a certain limitation. Specifically, a proper dimension in accordance with the dot density during plotting is determined by experiment or the like.

Thus, the present embodiment performs the control operations ①, ②, and ③ in combination so that the dot data processor 407 determines the spot configuration on the basis of the control operation ① and further changes the spot configuration determined by the control operation ① depending on whether data is on the text region or on the middle density region (②, ③). However, it is also possible for the operator to select one or two from the three control operations via an operation panel or the like such that the selected operation or operations are performed.

Although the control operation ① has achieved gradation reproduction by combining variations in spot area with variations in pixel density in any of the density regions reproduced, it is also possible to perform reproduction of halftone data at least in the density region with poor gradation reproduction, particularly in the high and low density regions.

Although both the beam diameter and the pulse width have been varied in order to change the spot area, it is also possible to change the spot area by varying at least the beam diameter. In this case, however, the rate of change of the spot area is also reduced and the gradation value that can be represented thereby may slightly be reduced accordingly. Nevertheless, gradation reproduction is by far excellent compared with the foregoing plotting method in which the spot diameter is changed slightly by varying the beam intensity.

(Variations)

It will easily be appreciated that the present invention is not limited to the foregoing embodiments but may be embodied in the following variations.

(1) As a method of driving the laser diode 11, Embodiment 1 has adopted the pulse width modulation method whereby gradation is represented by varying the light emitting time per dot, while the beam intensity is held constant. Alternatively, it is also possible to represent gradation by a method of modulating the beam intensity. In this case, the direction in which the beam diameter is variable may be the main scanning direction.

However, since the beam intensity becomes lower as the density becomes lower in accordance with the beam intensity modulation method, there occurs the problem that, if the beam diameter is reduced in the low density region as in Embodiment 1, the dot diameter is reduced increasingly and the amount of adhered toner is extremely reduced, which oppositely degrades gradation reproduction in this portion.

Figure 19A:
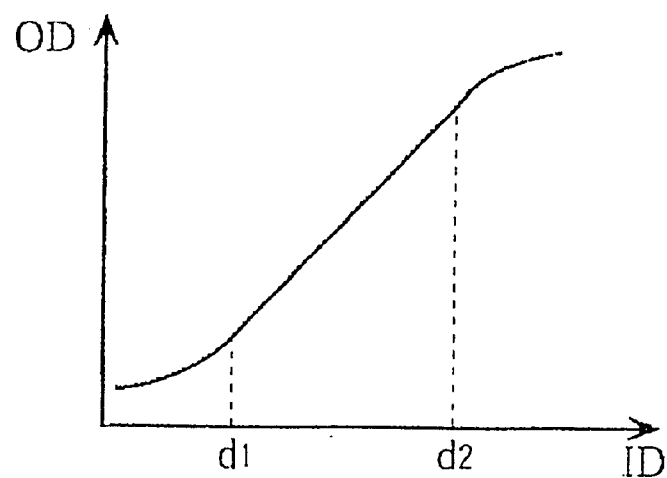
FIG. 19($a$) is a view showing conventional gradation reproducing properties, FIG. 19($b$) is a view showing the relationship between a density level and beam diameter control in driving a laser diode while modulating the intensity of a laser in Embodiment 1, and FIG. 19($c$) is a view showing gradation reproducing properties obtained by the present variation.
Figure 19B:
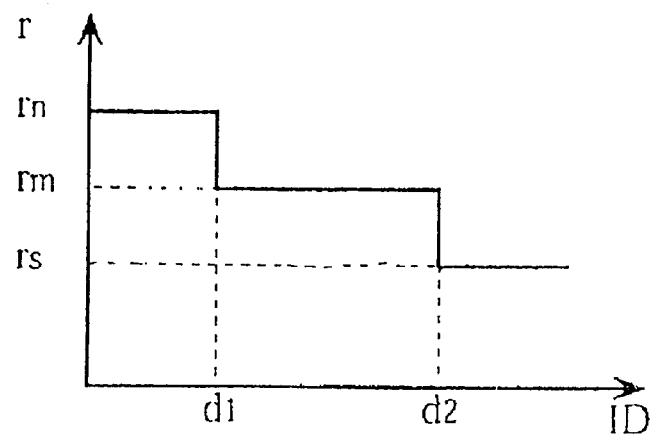
Figure 19C:
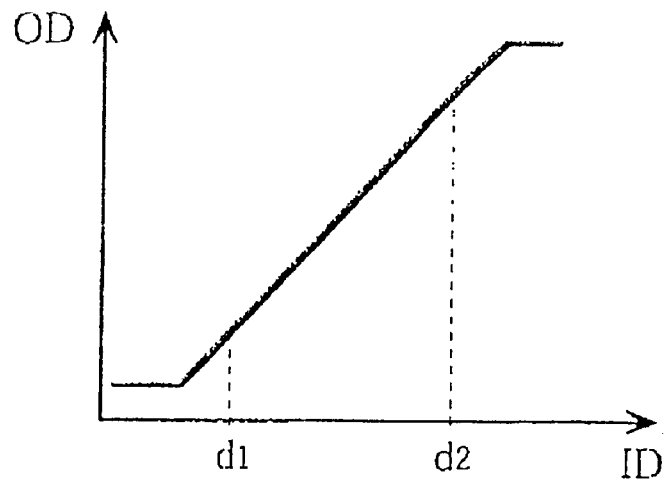

In the case of using the beam intensity modulation method, therefore, the beam diameter is increased to rn in the low density region, as shown in FIG. 19(b). This makes it possible to change the development density OD substantially linearly relative to the original density ID in any of the density regions, as shown in FIG. 19(c). FIG. 19(a) shows gradation reproducing properties in the conventional laser printer, similarly to FIG. 16(a).

(2) Although each of the foregoing embodiments has described the laser printer, it will easily be appreciated that the present invention is also applicable to a digital copier or facsimile. Although each of the foregoing embodiments has similarly described the single-color printer, the present invention is also applicable to a full-color image forming apparatus. In this case, a full-color image excellent in reproduction can be obtained by exerting the same beam diameter control as described above in performing plotting with respect to respective photosensitive drums for the reproduced colors of cyan, magenta, yellow, and black.

As described above, in the image forming apparatus for forming, based on image data, an image with a gradation by scanning an image carrying member with a light beam according to the present invention, the beam is generated by using a light beam generating element capable of independently varying the beam intensity and the beam diameter and used to scan the image carrying member. The output of the beam generating element is controlled based on the gradation level (density level) of the image data and the diameter of the beam from the element is controlled based on the gradation level. In short, the output of the light beam generating element and the beam diameter are controlled individually. In the case of reproducing image data composed of normal pixel-by-pixel gradation data or image data composed of halftone data, therefore, the exposed area of the surface of the image carrying member can be controlled properly by controlling the beam diameter as well as the output of the light beam generating unit. As a result, there can be obtained an image forming apparatus having excellent gradation reproduction over all the density regions.

In controlling the output of the light beam generating element, there are cases where a light emitting time per dot is controlled or the beam intensity is controlled, depending on the gradation level (density level) of image data. In the former case, the beam diameter is controlled to be smaller in plotting the high and low density portions than in plotting the middle density portion. In the latter case, since a control operation is performed such that the beam diameter becomes progressively smaller in the low, middle, and high density portions, excellent gradation reproduction is achieved by controlling the beam density suitably for the individual driving methods and thereby controlling the exposed area.

Moreover, the problem of different gradations at only one discontinuous dot and at continuous dots is eliminated by controlling the diameter of the beam from the light beam generating element such that it is larger in plotting the discontinuous dot than in plotting the continuous dots.

In the case of controlling the light-emitting time per dot for light beam generating means based on the gradation level, the problem of varying gradation depending on the pattern of dots to be plotted is similarly eliminated since the beam diameter is controlled such that the area of the surface portion of the image carrying member having exposure energy in excess of a specified threshold value is linearly proportional to the length of the time during which light is emitted from the light beam generating means.

In the case where the image data is halftone image data, the beam diameter is adjusted to be larger in plotting halftone dots in the middle density portion than in plotting halftone dots in the density portion other than the middle density portion, so that halftone shift is less noticeable in the resulting reproduced image.

In the case where the image data is halftone image data, in the same manner, determining means for determining whether or not image data of concern is image data on the text portion is provided and the beam diameter is adjusted to be larger in performing plotting based on the image data on the text portion than in performing plotting based on the image data on the non-text portion at the same density level. As a result, even a halftone image can be reproduced with a character portion well contoured and easy to read.

Since the present invention has used a laser element in which the beam output and beam diameter can be controlled independently, a compact and long-life laser scanning apparatus can be provided.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An image forming apparatus for forming an image having a gradation based on image data, comprising:
   a light beam generating element capable of independently changing a beam output and a beam diameter;
   a scanning unit which performs scanning with the beam generated from the light beam generating element;
   a first controller which controls the beam output based on a gradation level of the image data; and
   a second controller which controls the beam diameter based on the gradation level of the image data.

2. An image forming apparatus as claimed in claim 1, wherein said beam diameter is variable in a direction which has a predetermined angle with a main scanning direction of said scanning unit.

3. An image forming apparatus as claimed in claim 1, wherein said light beam generating element includes a first control electrode for controlling the beam output and a second control electrode for controlling the beam diameter, said first controller controlling the beam output by controlling the amount of charge supplied to the first control electrode and said second controller controlling the beam diameter by controlling the amount of charge supplied to the second control electrode.

4. An image forming apparatus as claimed in claim 1, wherein said second controller includes a density region judging unit for judging which density region the image data belongs to based on the gradation level of the image data, said second controller controlling the beam diameter so that the beam diameter in the high and low density region is smaller than that in the middle density region.

5. An image forming apparatus as claimed in claim 4, wherein said second controller controls the beam diameter so that the beam diameter gradually increases in accordance with a increase of the gradation level in the low density region and gradually decreases in accordance with a increase of the gradation level in the high density region.

6. An image forming apparatus as claimed in claim 1, wherein said first controller controls the beam output so as to vary a light emitting time per dot based on the gradation level of the image data.

7. An image forming apparatus as claimed in claim 1, wherein said second controller includes a density region judging unit for judging which density region the image data belongs to based on the gradation level of the image data, said second controller controlling the beam diameter so that the beam diameter in the high density region is smaller than that in the middle density region and the beam diameter in the middle density region is smaller than that in the low density region.

8. An image forming apparatus as claimed in claim 1, wherein said first controller controls the beam output so as to vary a beam intensity based on the gradation level of the image data.

9. An image forming apparatus for forming an image having a gradation based on image data, comprising:

a light beam generating element capable of independently changing a beam output and a beam diameter;

a scanning unit which performs scanning with the beam generated from the light beam generating element;

a first controller which controls the beam output based on a gradation level of the image data; and a second controller which controls the beam diameter so that the beam diameter in forming a discontinuous dot is larger than that in forming continuous dots.

10. An image forming apparatus as claimed in claim 9, further comprising:

a gradation pattern memory which stores gradation patterns corresponding with the gradation level of the image data, wherein said image having the gradation is expressed by said gradation patterns with a plurality of dots.

11. An image forming apparatus as claimed in claim 10, further comprising:

a text region judging unit which judges whether or not the image data is included in text region; and a gradation pattern reading unit which reads the gradation pattern from said gradation pattern memory according to the judging result, wherein said second controller judges whether the discontinuous dot or continuous dots based on the read gradation pattern.

12. An image forming apparatus as claimed in claim 9, wherein said second controller judges whether the discontinuous dot or continuous dots based on dot data stored in a bit map memory.

13. An image forming apparatus for forming an image having a gradation based on image data, comprising:

a light beam generator capable of independently changing a beam output and a beam diameter;

a scanning unit which performs scanning with the beam generated from the light beam generating element;

a first controller which controls the beam output based on a gradation level of the image data;

a text region judging unit which judges whether or not the image is a text image based on the image data; and a second controller which controls the beam diameter so that the beam diameter in forming a text image is larger than that in forming a non-text image.

14. An image forming apparatus as claimed in claim 13, further comprising:

a halftone data generating unit which generates halftone dots having a dot density corresponding with the gradation level of the image data, wherein said image having a gradation is expressed by said halftone dots.

15. An image forming apparatus as claimed in claim 14, wherein said second controller controls the beam diameter based on the gradation level of the image data.

16. An image forming apparatus as claimed in claim 13, wherein said first controller controls at least one of a light emitting time per dot and a beam intensity based on the gradation level of the image data.

17. An image forming apparatus as claimed in claim 13, wherein said second controller includes a density region judging unit for judging which density region the image data belongs to based on the gradation level of the image data, said second controller controlling the beam diameter so that the beam diameter in the middle density region is larger than that in another density region.

18. An image forming apparatus for forming an image having a gradation on a image carrying member based on image data, comprising:

a light beam generating element capable of independently changing a beam output and a beam diameter;

a scanning unit which performs scanning with the beam generated from the light beam generating element;

a first controller which controls a light emitting time of the light beam generating element per dot based on a gradation level of the image data; and a second controller which controls the beam diameter so that an area having exposure energy in excess of a specified threshold value on the image carrying member is linearly proportional to the length of the light emitting time.

* * * * *